United States Patent
Murakami

(10) Patent No.: US 10,542,240 B2
(45) Date of Patent: Jan. 21, 2020

(54) PROJECTOR AND METHOD FOR CONTROLLING ROTATION OF PHOSPHOR WHEEL AND COLOR WHEEL IN PROJECTOR

(71) Applicant: NEC Display Solutions, Ltd., Tokyo (JP)

(72) Inventor: Masayuki Murakami, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 16/331,919

(22) PCT Filed: Sep. 16, 2016

(86) PCT No.: PCT/JP2016/077526
§ 371 (c)(1),
(2) Date: Mar. 8, 2019

(87) PCT Pub. No.: WO2018/051500
PCT Pub. Date: Mar. 22, 2018

(65) Prior Publication Data
US 2019/0199981 A1    Jun. 27, 2019

(51) Int. Cl.
*H04N 9/31*    (2006.01)
*G03B 21/00*    (2006.01)
*G03B 21/20*    (2006.01)

(52) U.S. Cl.
CPC ......... *H04N 9/3114* (2013.01); *G03B 21/008* (2013.01); *G03B 21/204* (2013.01); *H04N 9/312* (2013.01)

(58) Field of Classification Search
CPC .... H04N 9/3114; H04N 9/312; G03B 21/008; G03B 21/204
USPC .......................................... 348/743
See application file for complete search history.

(56) References Cited

U.S. PATENT DOCUMENTS

| | | | |
|---|---|---|---|
| 2013/0242534 A1* | 9/2013 | Pettitt | G03B 21/204 362/84 |
| 2014/0369025 A1* | 12/2014 | Mehl | G03B 21/204 362/84 |
| 2015/0109584 A1* | 4/2015 | Murai | H04N 9/3114 353/31 |

(Continued)

FOREIGN PATENT DOCUMENTS

| | | |
|---|---|---|
| JP | 2004-347645 A | 12/2004 |
| JP | 2012-003213 A | 1/2012 |

(Continued)

OTHER PUBLICATIONS

International Search Report (ISR) (PCT Form PCT/ISA/210), in PCT/JP2016/077526, dated Nov. 22, 2016.

*Primary Examiner* — Michael Lee
(74) *Attorney, Agent, or Firm* — McGinn IP Law Group, PLLC

(57) ABSTRACT

In order to ensure uniform gradation reproducibility even when an error occurs in a phosphor wheel or a color wheel, an image in which gradations change in steps is displayed and the rotation operation of a phosphor wheel and a color wheel is controlled on the basis of color coordinate values of each gradation that are measured each time the input timings of the first reference signal and the second reference signal are changed a plurality of times.

9 Claims, 18 Drawing Sheets

(56) References Cited

U.S. PATENT DOCUMENTS

| | | | | |
|---|---|---|---|---|
| 2015/0219984 A1* | 8/2015 | Matsubara | ............ | G02B 26/008 353/31 |
| 2016/0033854 A1* | 2/2016 | Pettitt | .................. | G03B 21/204 353/7 |
| 2017/0347075 A1* | 11/2017 | Okuda | ................. | G03B 21/204 |
| 2018/0224731 A1* | 8/2018 | Yoshikawa | .............. | G02B 5/20 |
| 2019/0086780 A1* | 3/2019 | Ikeda | .................... | G03B 21/204 |

FOREIGN PATENT DOCUMENTS

| JP | 2013-225089 A | 10/2013 |
|---|---|---|
| JP | 2015-195564 A | 11/2015 |
| JP | 2016-105122 A | 6/2016 |

\* cited by examiner

[Figure 1]
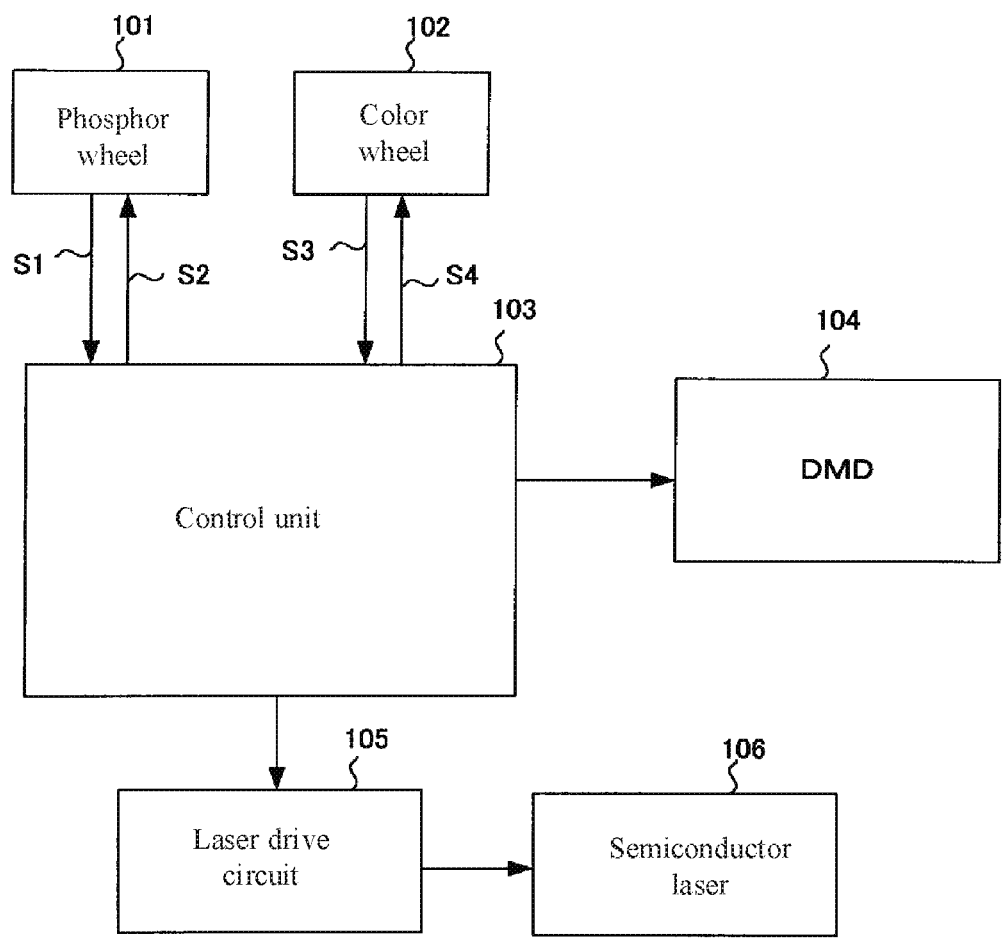

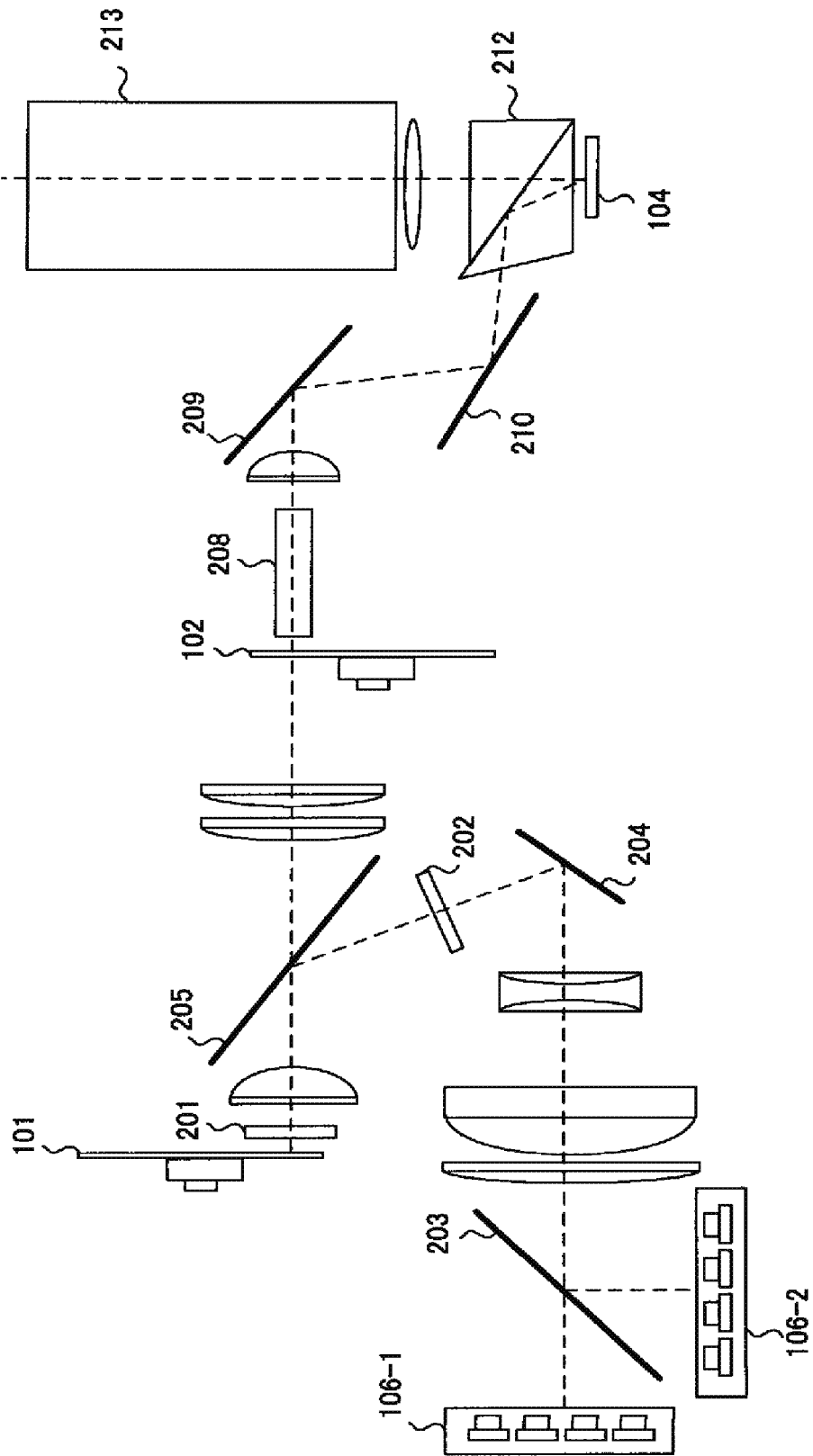
[Figure 2]

[Figure 3]
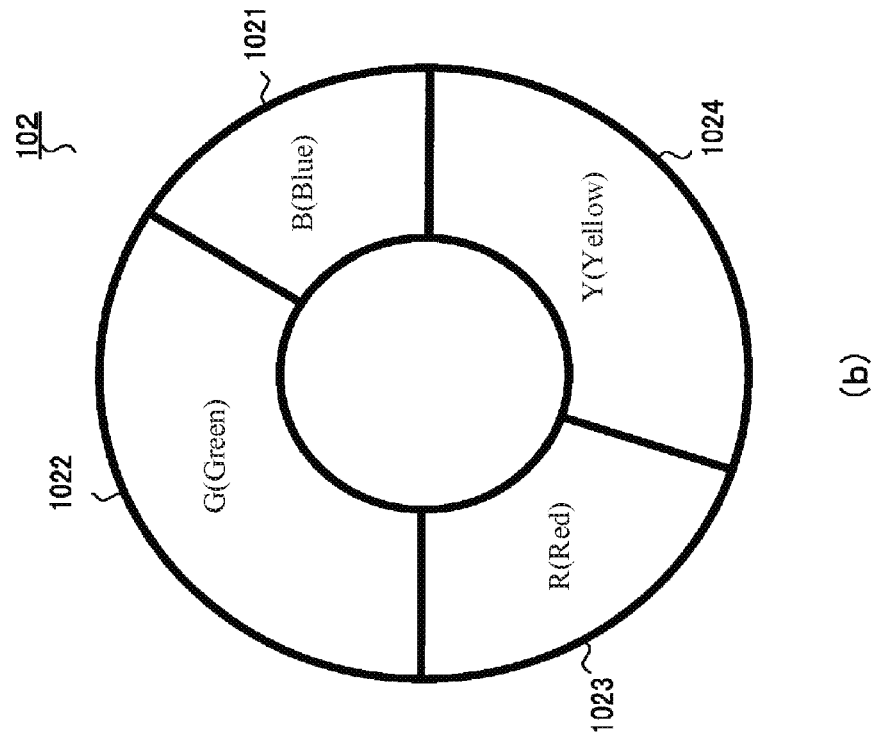
(b)
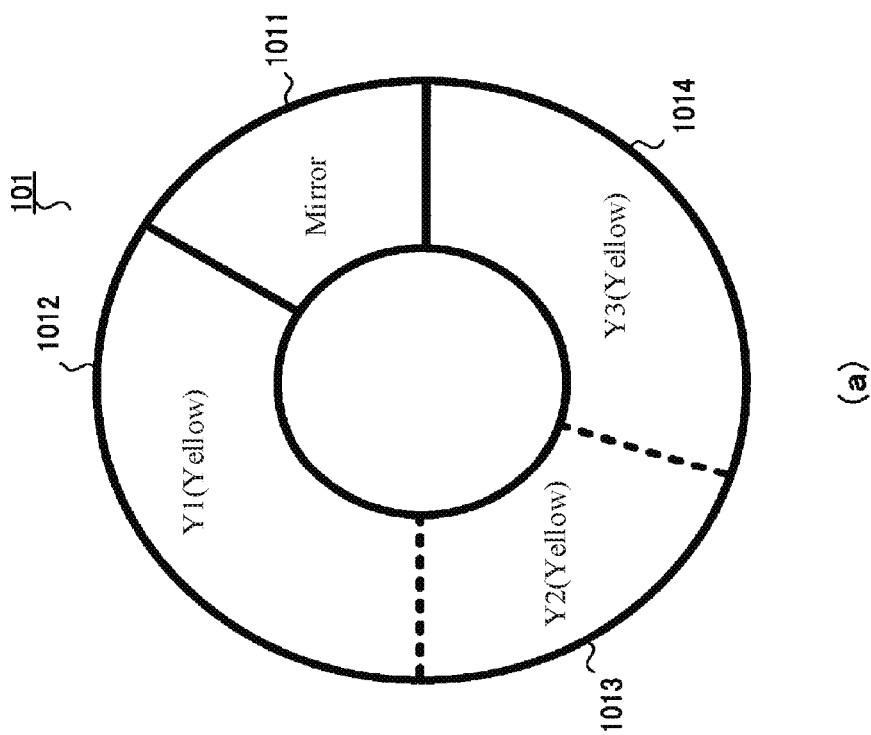
(a)

[Figure 4]
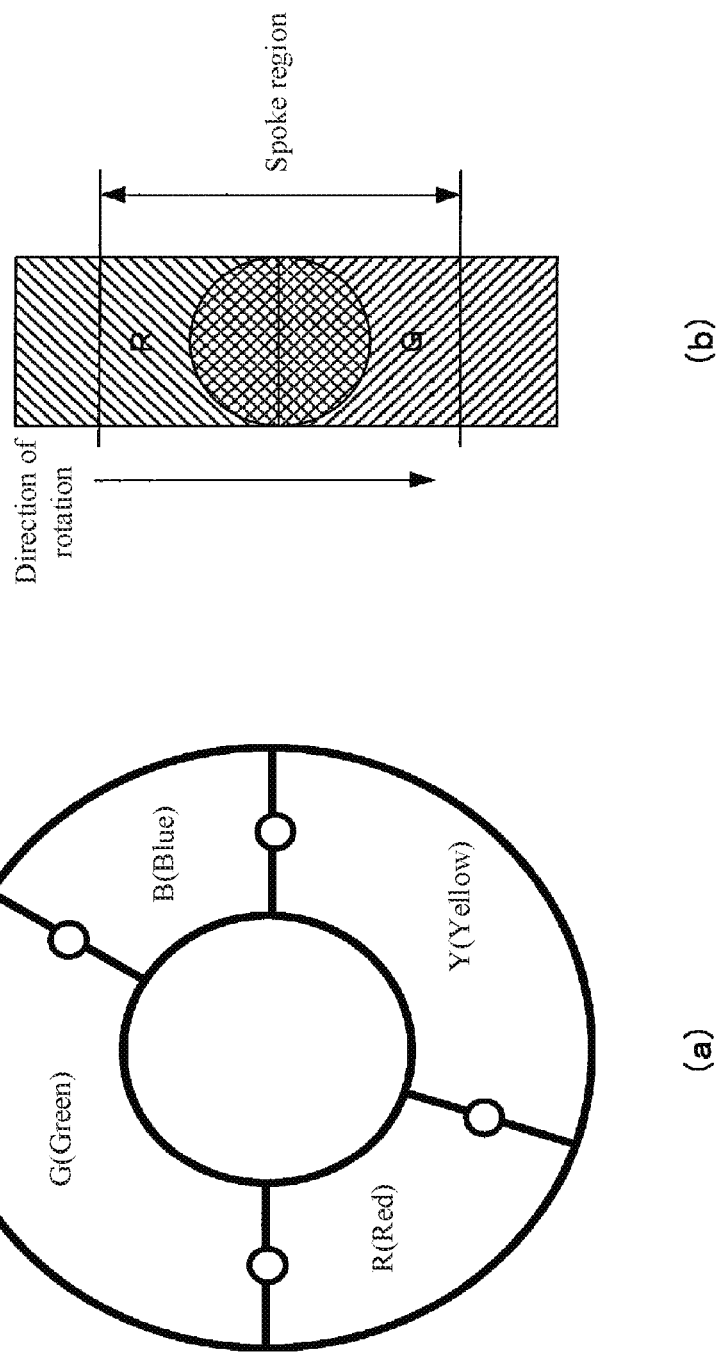

[Figure 5]
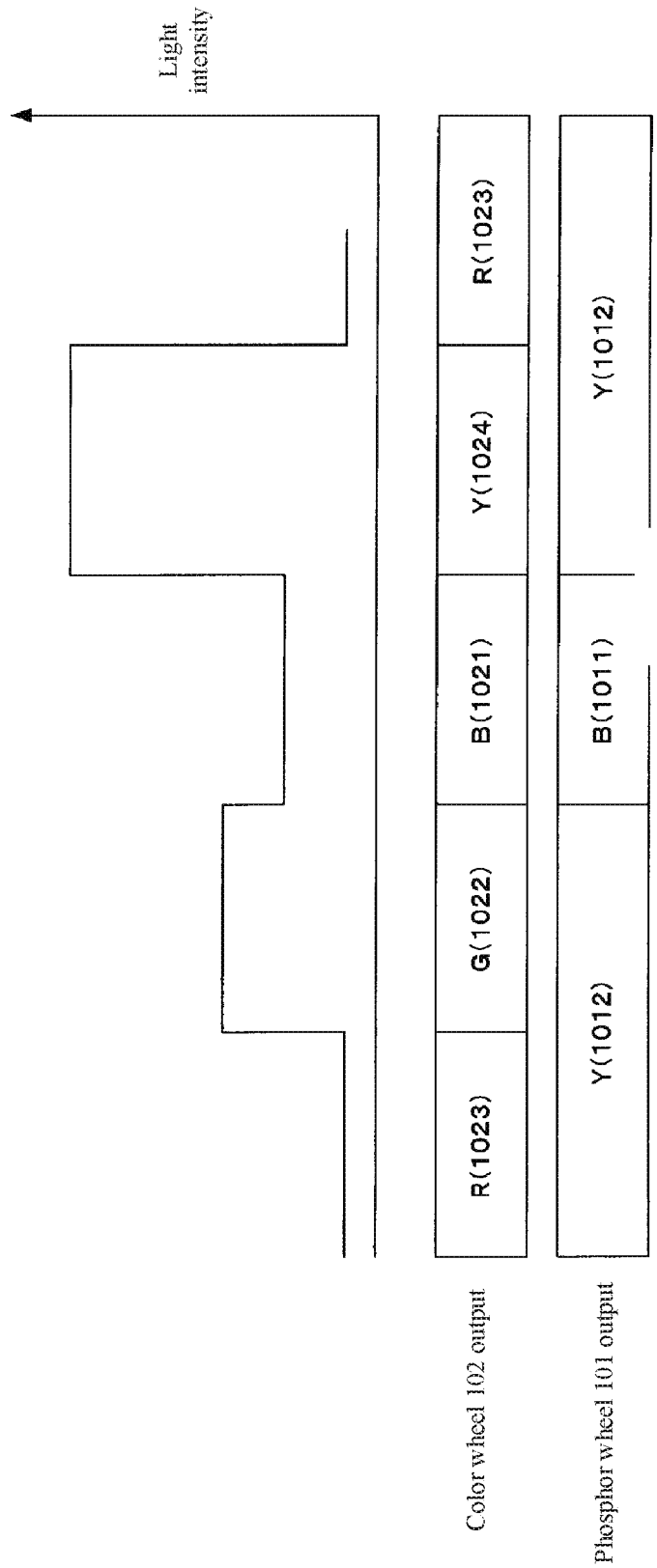

[Figure 6]
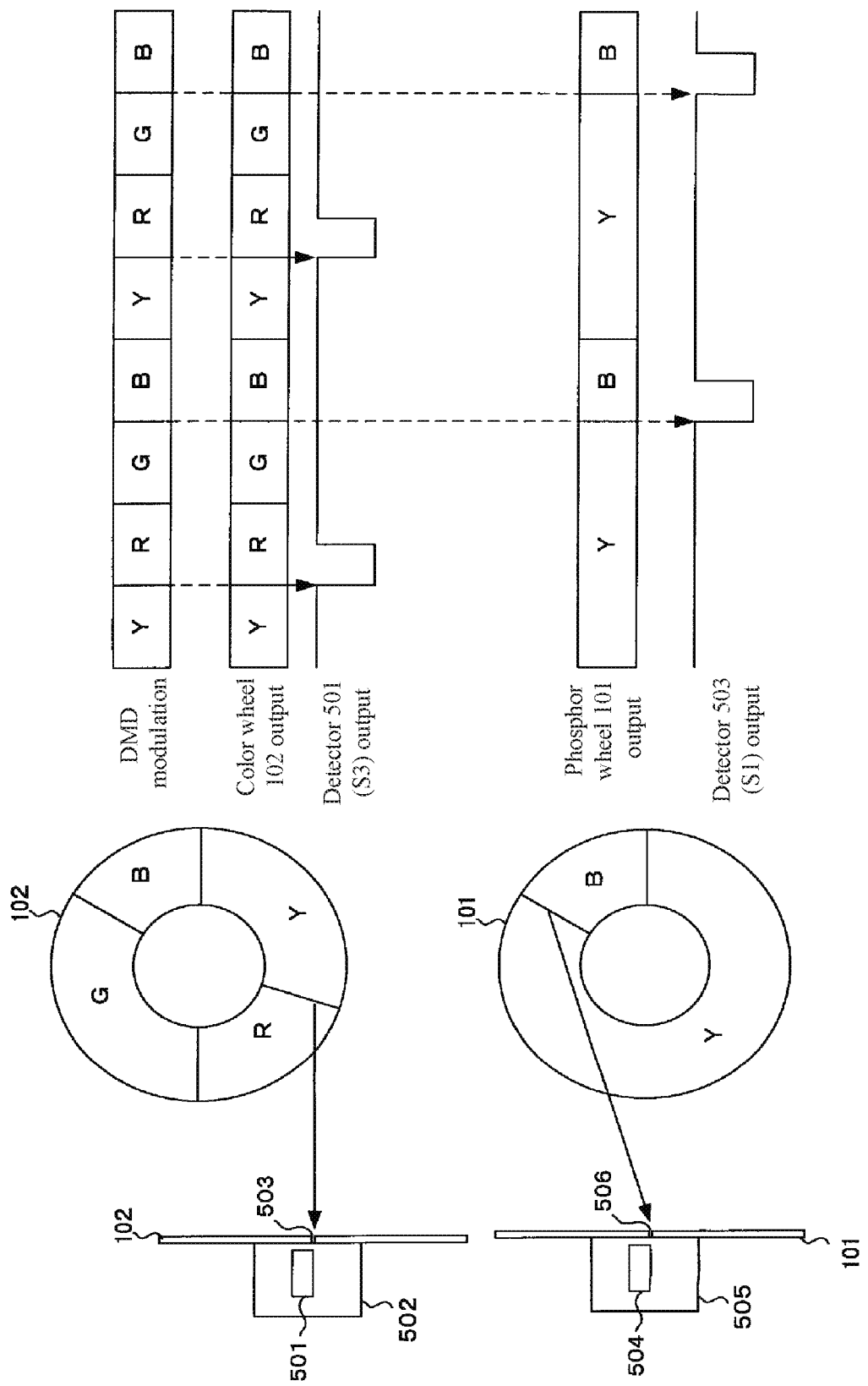

[Figure 7]
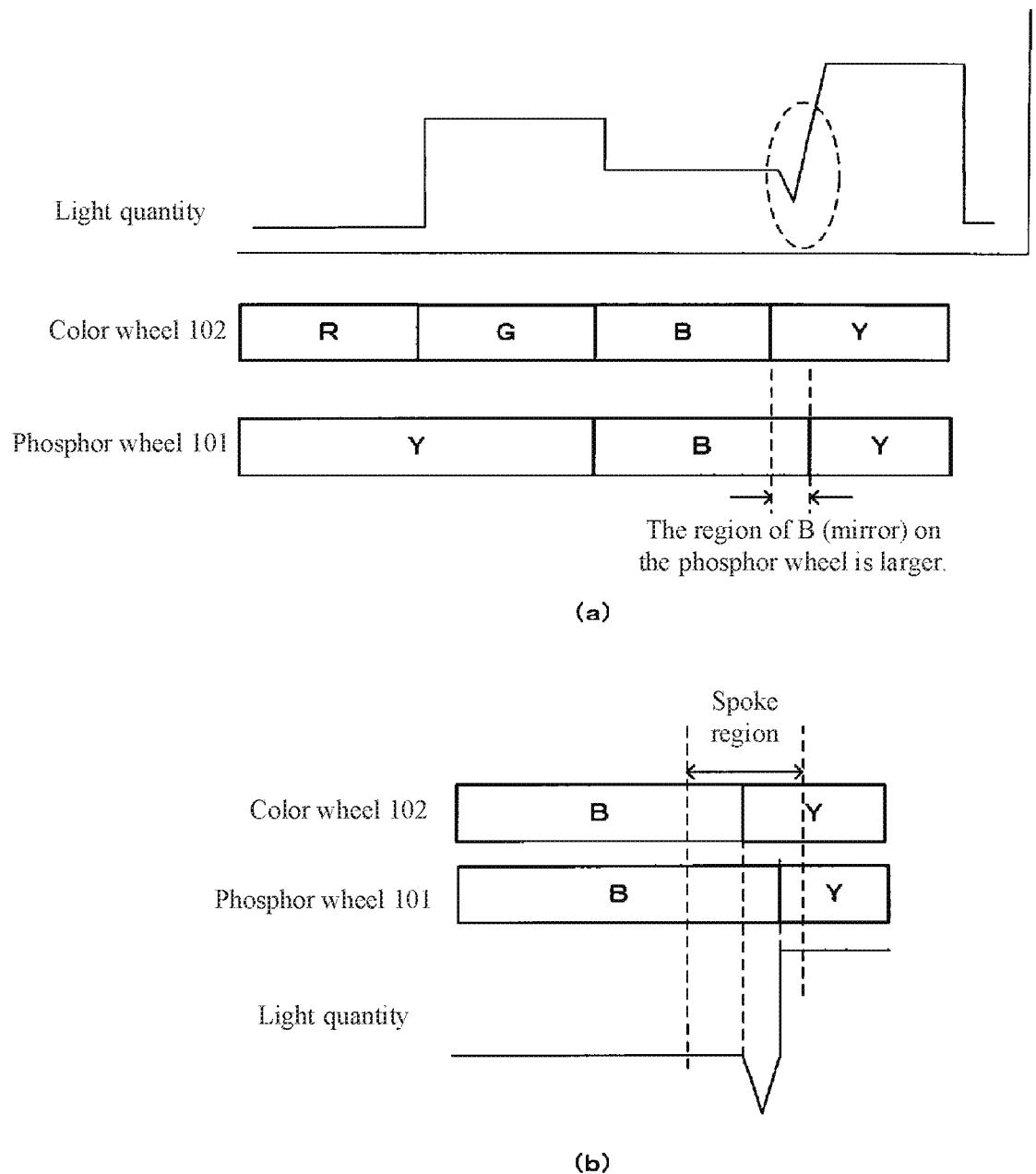

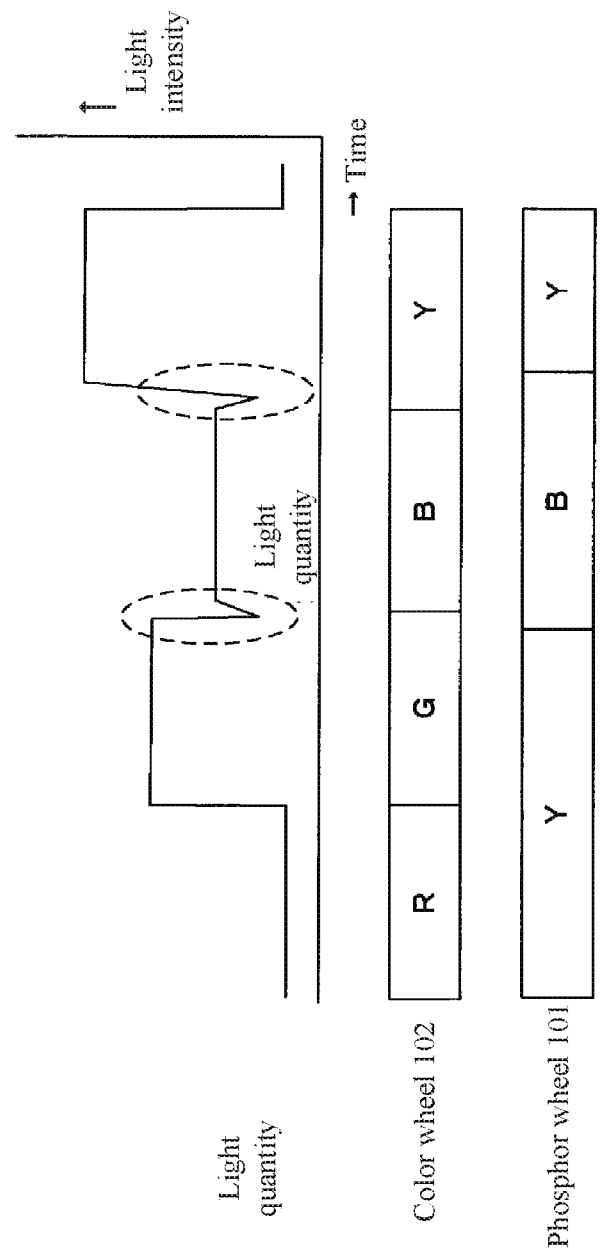
[Figure 8]

[Figure 9]
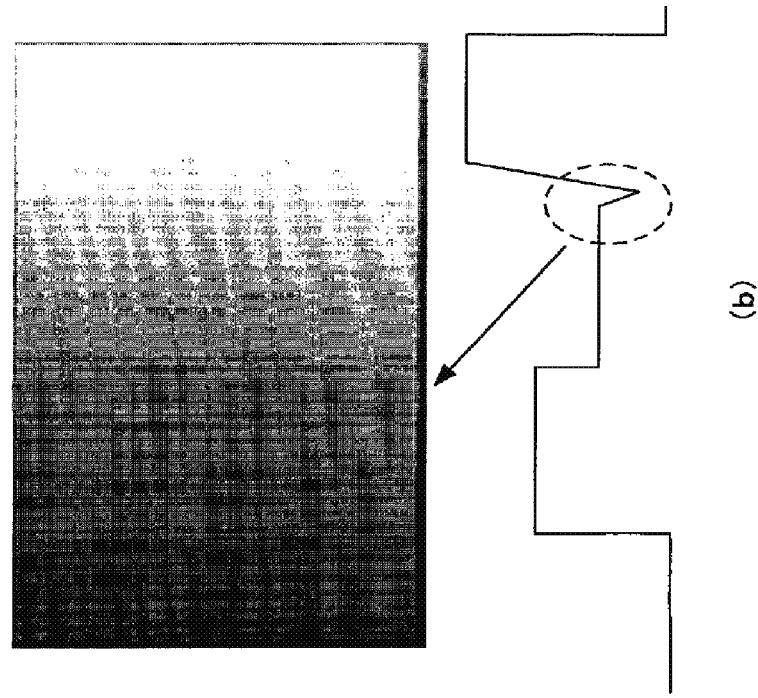
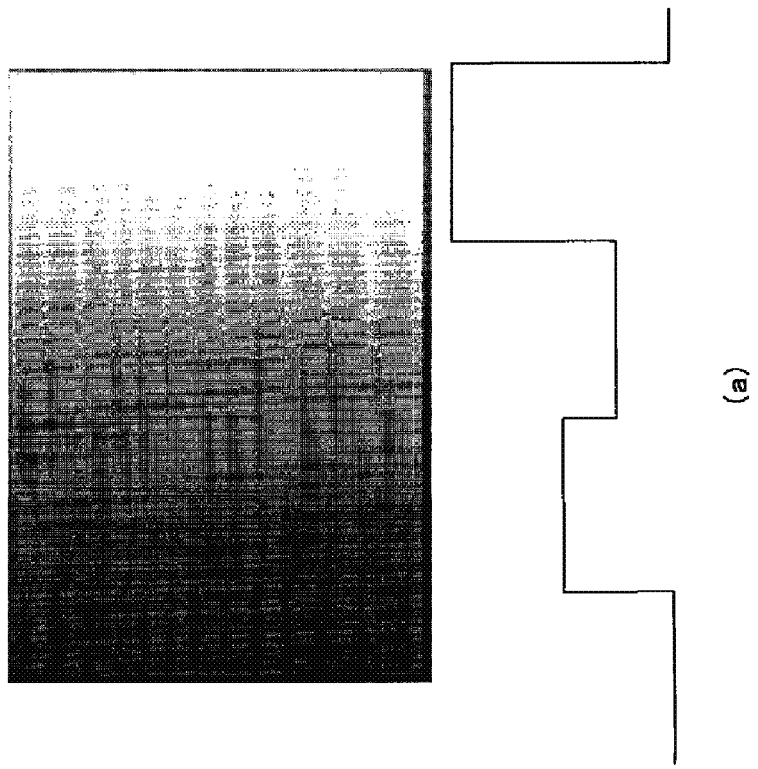

[Figure 10]
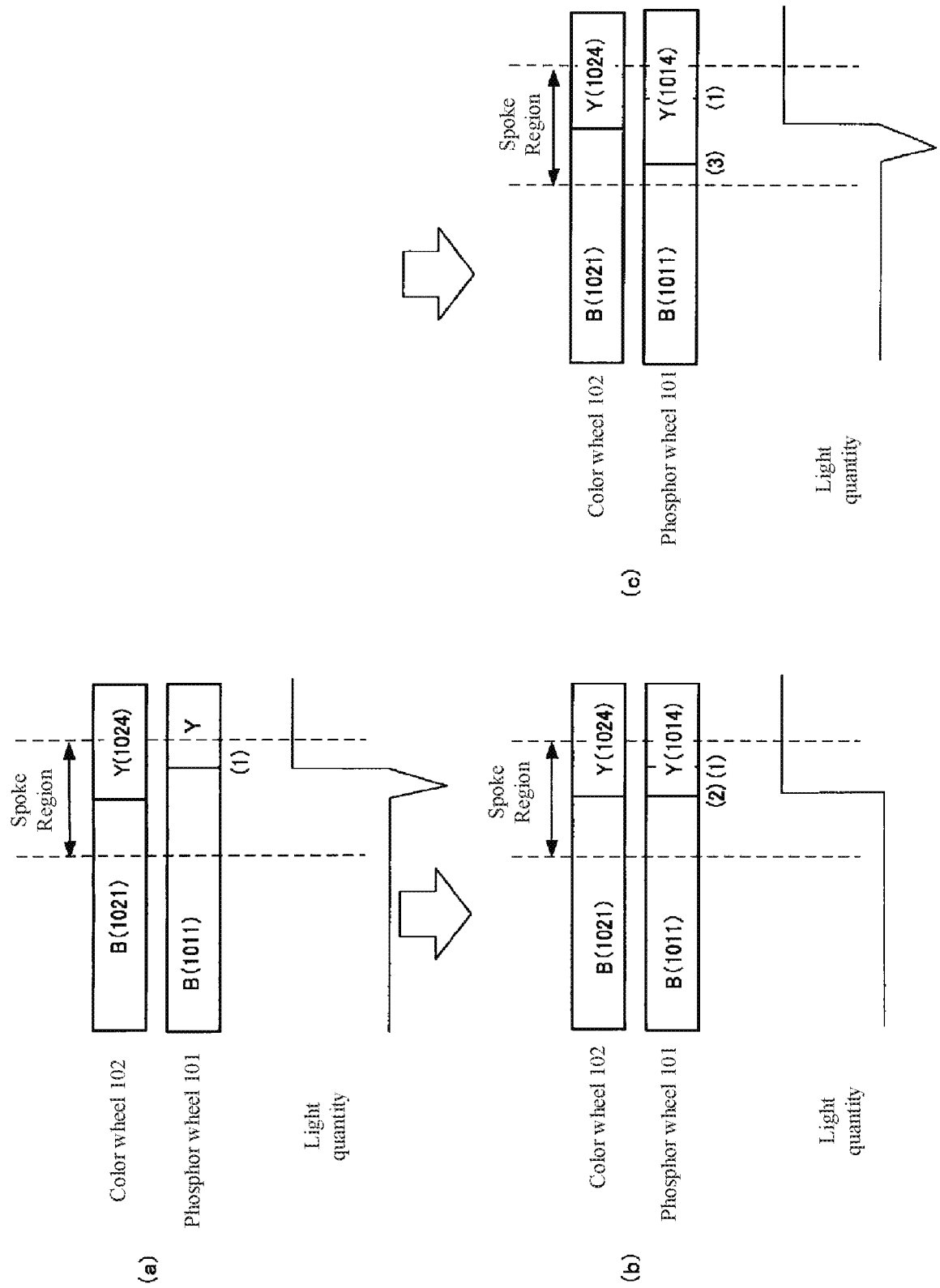

[Figure 11]
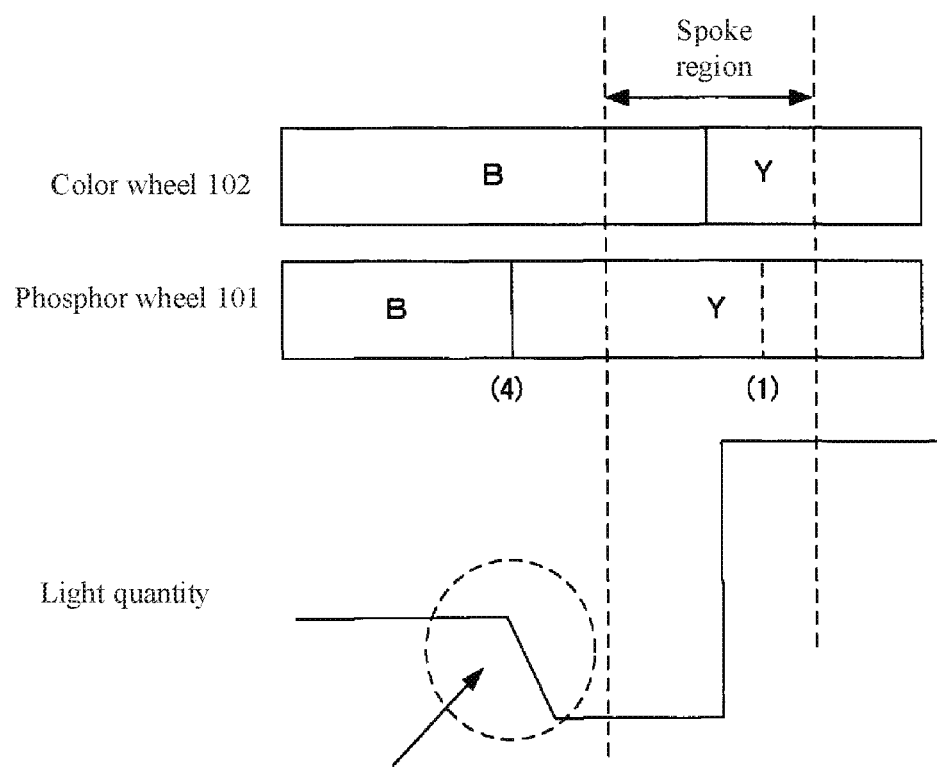

[Figure 12]
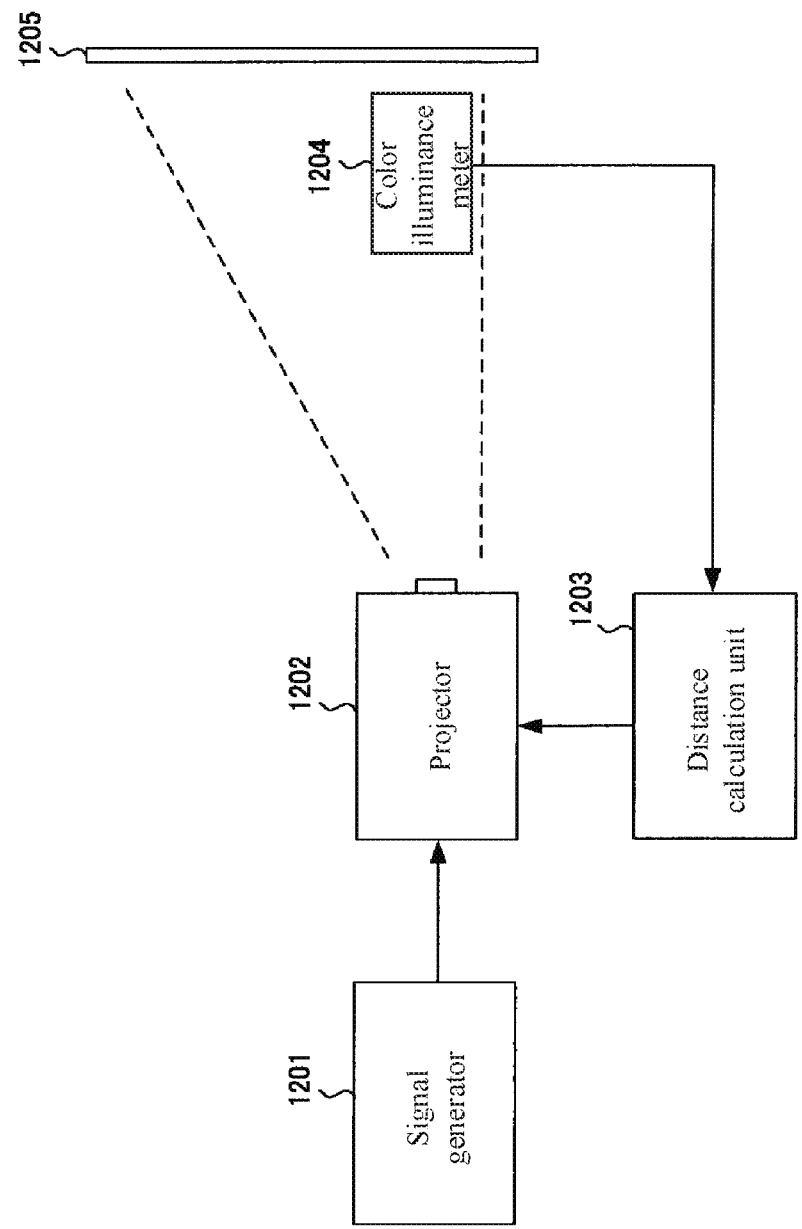

[Figure 13]
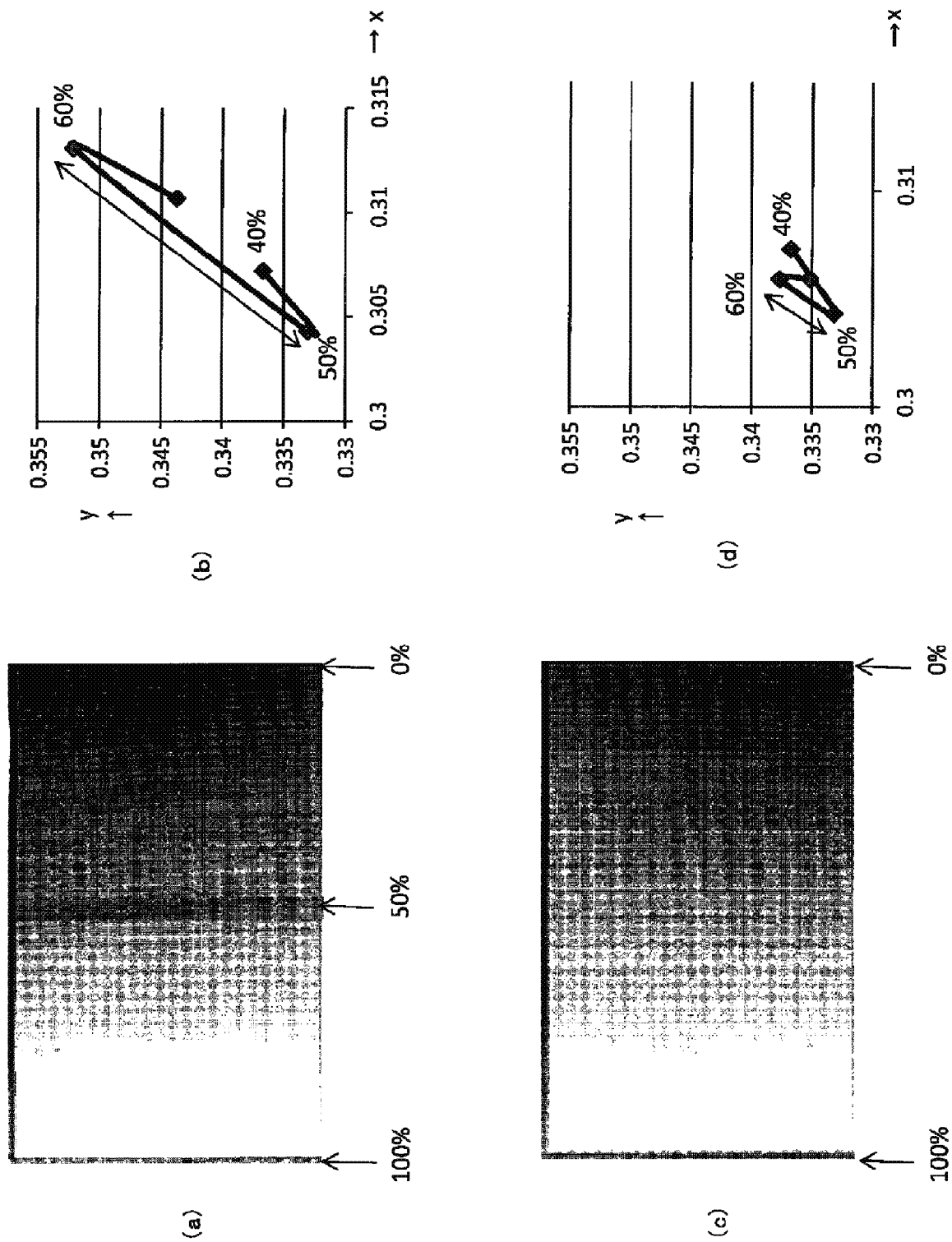

[Figure 14]
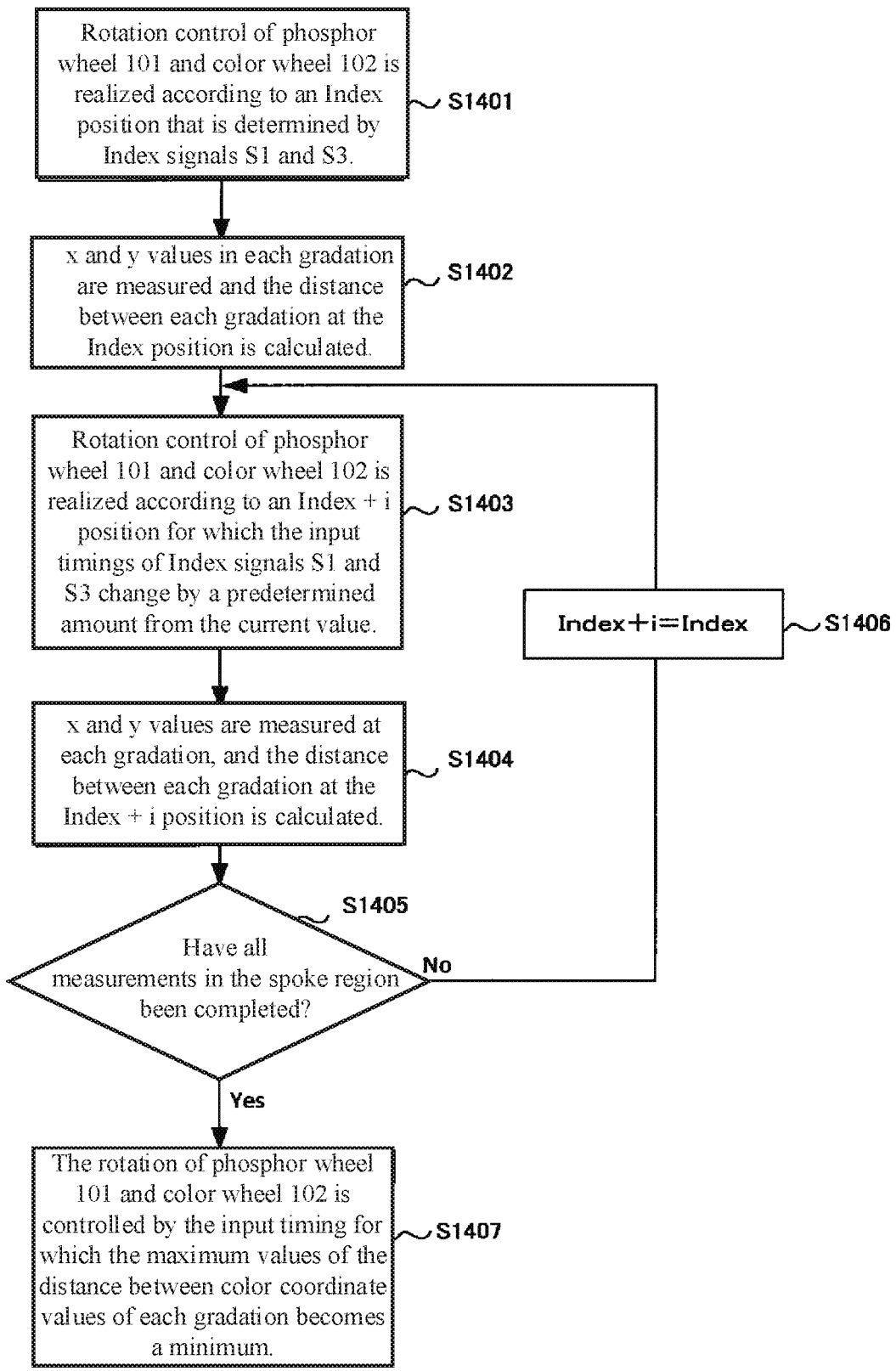

[Figure 15]
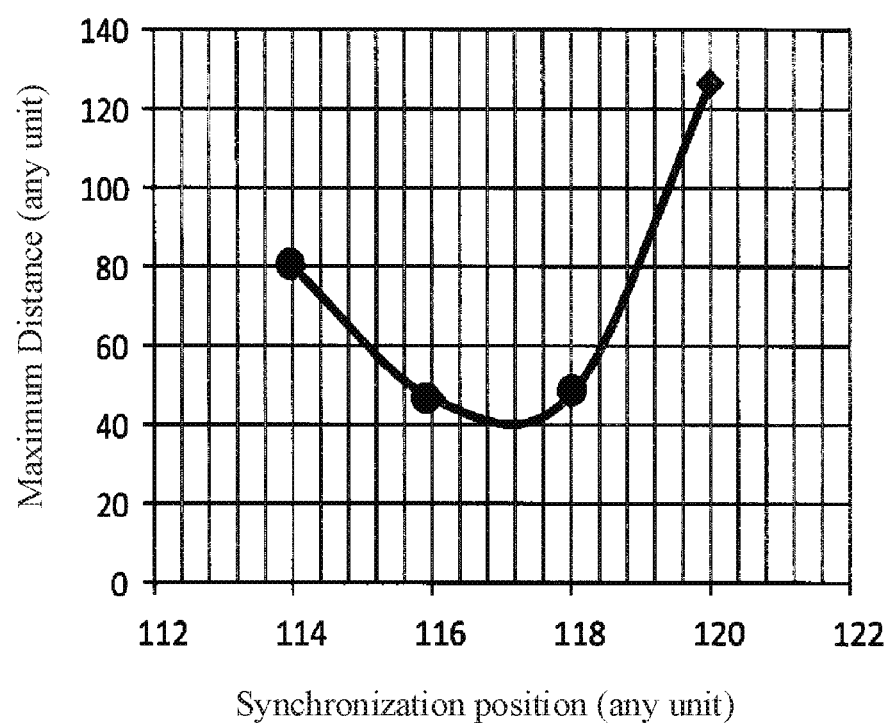

[Figure 16]
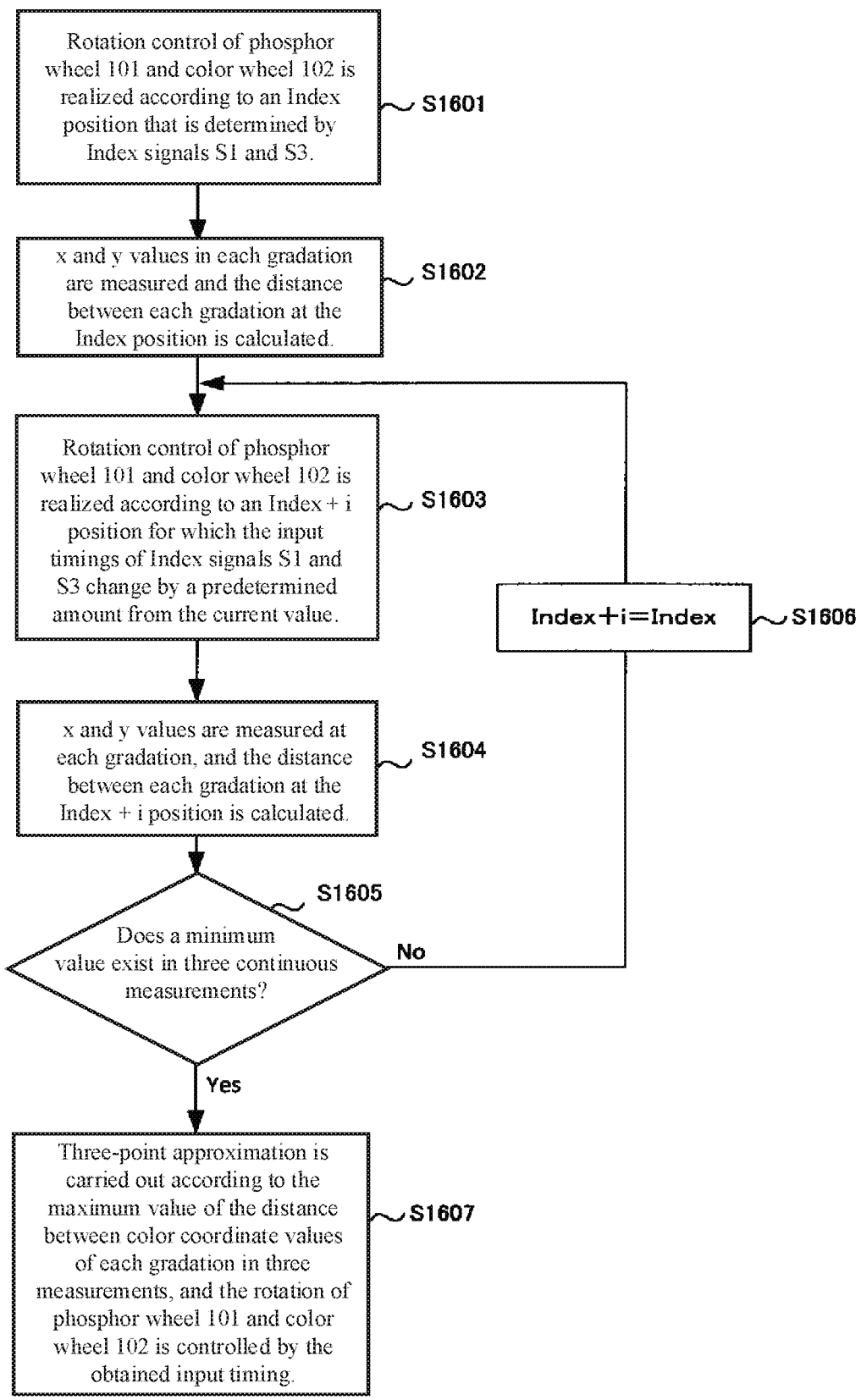

[Figure 17]
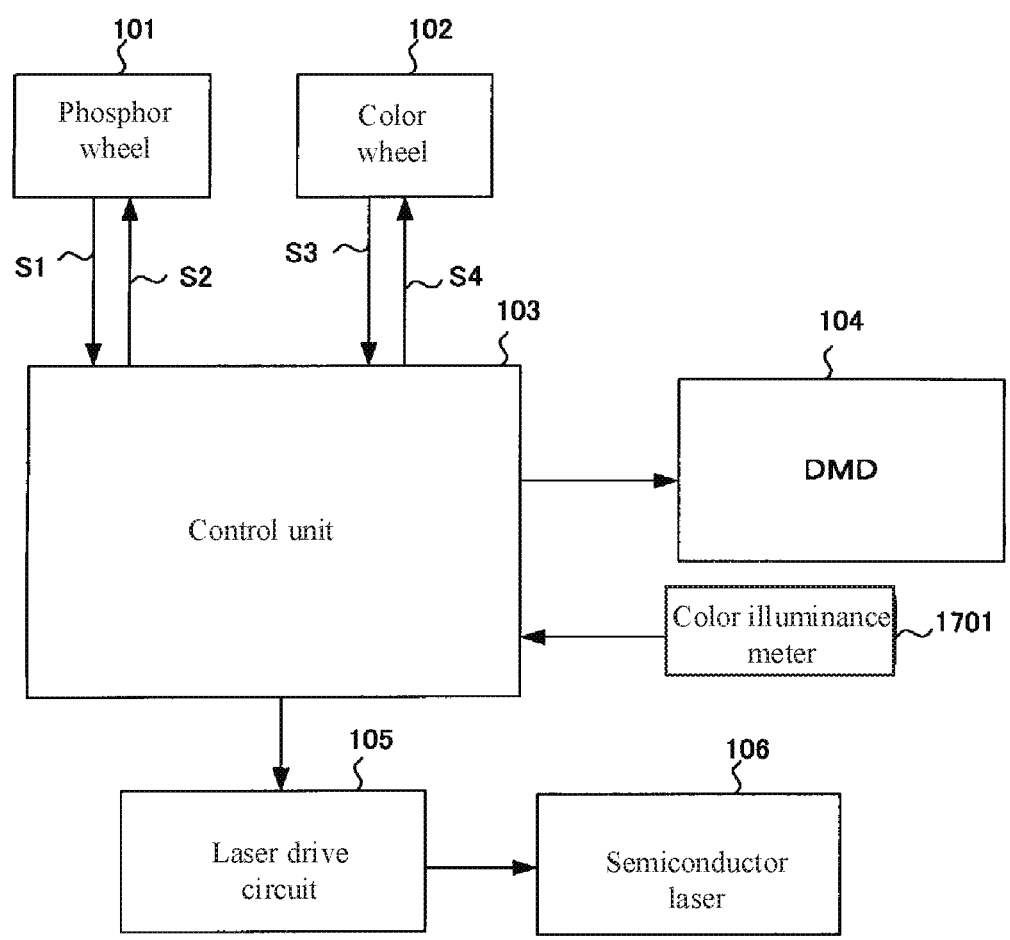

[Figure 18]
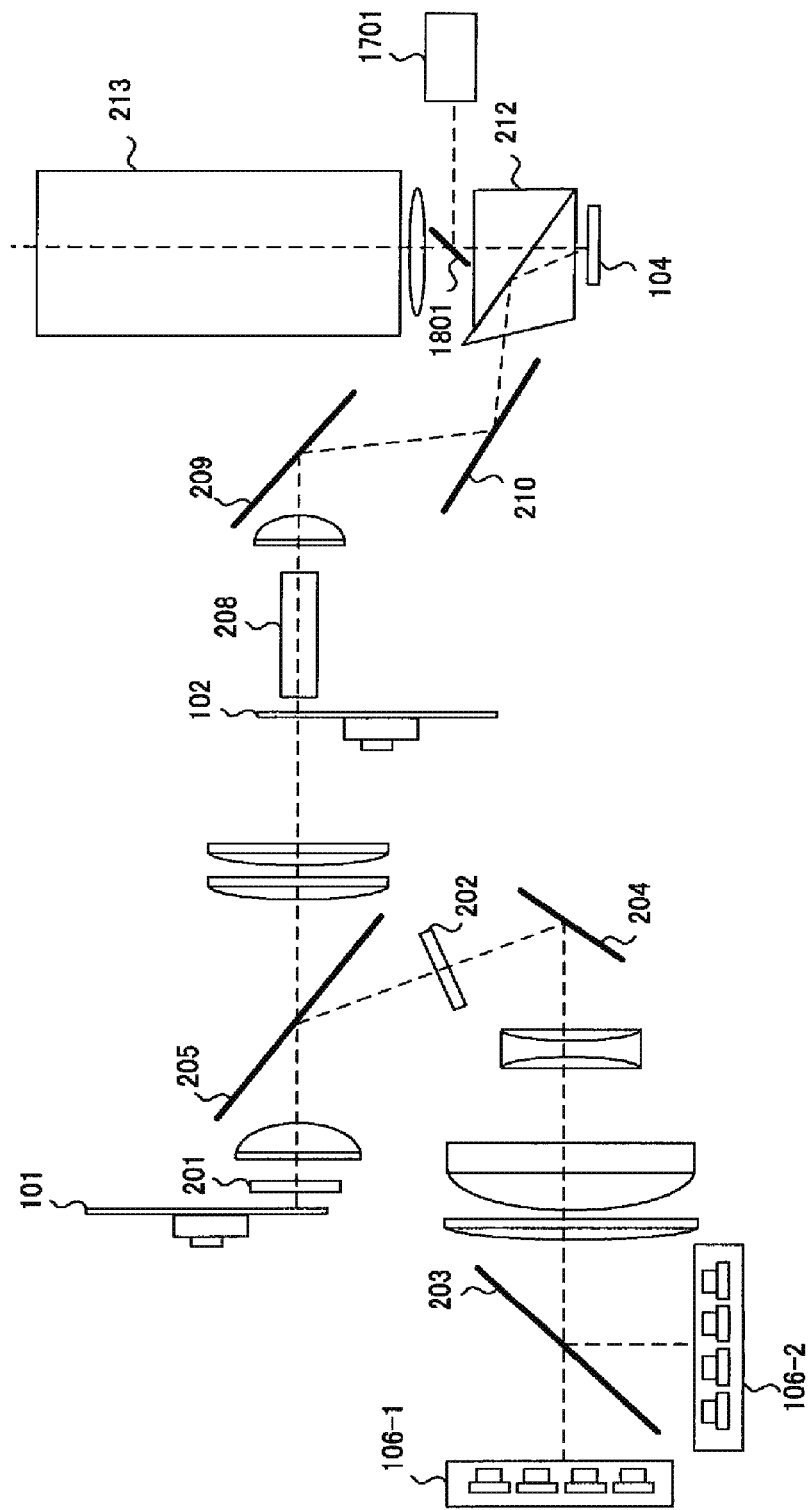

PROJECTOR AND METHOD FOR CONTROLLING ROTATION OF PHOSPHOR WHEEL AND COLOR WHEEL IN PROJECTOR

TECHNICAL FIELD

The present invention relates to a projector, and more particularly relates to a projector in which fluorescence generated by a phosphor wheel is converted using a color wheel and the converted light is modulated and projected.

BACKGROUND ART

Projectors that use color wheels are disclosed in Patent Document 1 (Japanese Unexamined Patent Application Publication No. 2012-3213) and Patent Document 2 (Japanese Unexamined Patent Application Publication No. 2013-225089). In addition, an image display device that uses a phosphor wheel is disclosed in Patent Document 3 (Japanese Unexamined Patent Application Publication No. 2015-195564).

Patent Document 1 and Patent Document 2 disclose technology of adjusting the timing of a modulation operation realized by display elements and the rotation timing of a color wheel, and Patent Document 3 discloses a technology of synchronizing the rotation of a phosphor wheel and the drive of a light valve.

When using a color wheel and a phosphor wheel as described above, because these components rotate, synchronization with the drive of other constituent elements becomes crucial.

FIG. 1 is a block diagram showing the configuration of the control system of a projector that is provided with a color wheel and a phosphor wheel, and FIG. 2 shows the configuration of the optical system.

Control unit 103 shown in FIG. 1 controls the rotation operation of phosphor wheel 101 and color wheel 102, the modulation operation of DMD (Digital Micromirror Device) 104, and the output state of semiconductor laser 106 by way of laser drive circuit 105.

Control unit 103 causes phosphor wheel 101 to rotate by means of drive signal S2 and receives as input from phosphor wheel 101 Index signal S1 that indicates the rotational state of phosphor wheel 101. Control unit 103 further causes color wheel 102 to rotate by means of drive signal S4 and receives as input from color wheel 102 Index signal S3 that indicates the rotational state of color wheel 102.

The optical system shown in FIG. 2 is next described.

Laser light supplied from semiconductor laser arrays 106-1 and 106-2 that accommodate a plurality of semiconductor lasers is synthesized by polarization beam splitter 203. Semiconductor laser array 106-1 supplies blue P-polarized laser light, and semiconductor laser array 106-2 supplies blue S-polarized laser light. Polarization beam splitter 203 transmits P-polarized light and reflects S-polarized light, and as a result, the laser light supplied from each of semiconductor laser arrays 106-1 and 106-2 is synthesized by polarization beam splitter 203 and applied as input in a high-intensity state to polarization beam splitter 205 by way of mirror 204 and polarization conversion device 202.

Polarization conversion device 202 is a component that combines a polarization beam splitter, a mirror, and a half-wave plate, and of the irradiated blue P-polarized and S-polarized laser light, converts the P-polarized light to S-polarized light and emits all of the light unified to S-polarized light.

Polarization beam splitter 205 transmits yellow light, and regarding blue light, transmits the P-polarized component and reflects the S-polarized component, and the S-polarized blue laser light from polarization conversion device 202 is reflected and irradiated into phosphor wheel 101 by way of quarter-wave plate 201.

As shown in FIG. 3(a), in phosphor wheel 101, mirror 1011 that reflects incident light is formed on one portion, and phosphors 1012-1014 that are excited by incident light to emit yellow fluorescence are formed continuously in portions other than mirror 1011. When blue laser light is irradiated into mirror 1011, the light is reflected as is, and when irradiated into phosphors 1012-1014, yellow fluorescence is emitted. Because phosphor wheel 101 is rotating, blue laser light and yellow fluorescence are generated in a time series, and this light is irradiated by way of quarter-wave plate 201 into polarization beam splitter 205. At this time, when reflected by polarization beam splitter 205 and directed toward phosphor wheel 101, the blue laser light is S-polarized light, but subsequently, after having passed two times through quarter-wave plate 201, is irradiated into polarization beam splitter 205 in a P-polarized state. As a result, the blue laser light and yellow fluorescence that are in a time series both pass through polarization beam splitter 205 and are irradiated into color wheel 102.

As shown in FIG. 3(b), color wheel 102 is provided with regions 1021-1024 that make the color of transmitted light blue (B), green (G), red (R), and yellow (Y), and as a result, region 1021 corresponds to mirror 1011 of phosphor wheel 101, and regions 1022-1024 correspond to phosphors 1012-1014 of phosphor wheel 101. A diffusion plate is formed on region 1021 to which blue laser light is irradiated. Glass that transmits the transmitted light as is can be used in region 1024 to which yellow fluorescence is irradiated. For example, when the base plate of color wheel 102 is glass, the glass can be used without alteration. Of regions 1022 and 1023 to which yellow fluorescence is irradiated, a filter that transmits only G light is formed in region 1022, and a filter that transmits only R light is formed in region 1023. As a result, R, G, B, and Y light is emitted in a time series from color wheel 102.

The emitted light of color wheel 102 passes through rod integrator 208 and is uniformized, then turned back by mirrors 209 and 210 and irradiated into TIR prism 212, again irradiated into TIR prism 212 after undergoing modulation by DMD 104, and finally enlarged and projected by projection lens 213.

In the case of the optical system such as shown in FIGS. 1 and 2, phosphor wheel 101 and color wheel 102 must constantly be caused to rotate in synchronization at a timing in which regions 1021-1024 of color wheel 102 correspond to mirror 1011 and phosphors 1012-1014 of phosphor wheel 101.

In a spoke region where the same light beam is irradiated to a different regions of color wheel 102, a mixed color is generated, and as a result, this light cannot be used as R, G, and B light. FIG. 4(a) shows the sites at which spoke regions occur, and FIG. 4(b) shows a spoke region.

The light that is generated at spoke regions that are indicated by white circles in FIG. 4(a) can be used as white light and complementary colors (Cyan, Magenta, Yellow). The light (hereinbelow referred to as "RG") that is generated in the spoke region between R and G as shown in FIG. 4(b) can be used as Y.

When making up white light without using light that is generated at a spoke region, i.e., when:

White=Red+Green+Blue+Yellow the gradation reproducibility is good, but the brightness is reduced because the light that is generated at a spoke region is not used.

When light that is generated in spoke regions is used to make up white light, i.e., when:

White=Red+Green+Blue+Yellow+RG+GB+BY+YR (where GB is light generated between G and B, BY is light generated between B and Y, and YR is light generated between Y and R), all of the output light of color wheel 102 is used and the brightness of white light can be increased, but as a side effect, the possibility arises that the gradation reproducibility of an image worsens. This effect results because color is not uniform for light that is generated in spoke regions.

Compared to a projector in which the light source is configured using only a color wheel and without using phosphor wheel, the projector that is shown in FIG. 1 and FIG. 2 uses two wheels, and because divergence from synchronization caused by adjustment error of each wheel tends to occur, tends to suffer even greater deterioration in gradation reproducibility.

FIG. 5 shows the ideal light output in the projector shown in FIGS. 1 and 2, and in order to achieve ideal output such as shown in FIG. 5, control must be implemented such that the modulation operation of DMD 104 and the rotation operation of each wheel are synchronized.

As shown in FIG. 1, along with implementing control of the modulation operation of DMD 104 and receiving as input from phosphor wheel 101 and color wheel 102 Index signals S1 and S3 that indicate the rotational state of each wheel, control unit 103 detects the rotation operation of each wheel and implements control of the rotation operation of each wheel. The control of control unit 103 is next described with reference to FIG. 6.

On phosphor wheel 101 that is shown on the lower side of FIG. 6, mark 506 is provided at the position that is the emission start of Y (yellow) light at the time of the rotating state. Motor 505 that causes phosphor wheel 101 to rotate and detector 504 that detects mark 506 are provided on the side opposite the surface of incidence of the excitation light of phosphor wheel 101. On color wheel 102 that is shown on the upper side of FIG. 6, mark 503 is provided at the position that is the start of emission of Y (yellow) light during the state of rotating. Motor 502 that causes color wheel 102 to rotate and detector 501 that detects mark 503 are provided on the side opposite the surface of light incidence of color wheel 102.

Detector 504 is provided corresponding to the position of phosphor wheel 101 that is irradiated by excitation light and at which fluorescence or excitation light is emitted, and detector 501 is provided corresponding to an irradiation/emission position of color wheel 102 that is irradiated by light from phosphor wheel 101 and that emits B, G, R, and Y light in a time series.

Protuberances or holes can be used as marks 503 and 506, and photointerrupters or Hall elements can be used as detectors 501 and 504, but no particular limitations apply to these features.

The output of detectors 504 and 501 is supplied to control unit 103 as Index signals S1 and S3, and control unit 103 is thus able to detect that the irradiation/emission positions on color wheel 102 and phosphor wheel 101 are at the reference positions provided with marks 506 and 503.

Control unit 103 causes DMD 104 to display of B, G, R, and Y images in order, but in order to bring about the output of normal pictures, the reference positions of color wheel 102 and phosphor wheel 101 must be moved to the optimum positions in concert with the sequence of the DMD. Control unit 103 is able to implement rotation control that uses the reference positions of color wheel 102 and phosphor wheel 101, and in order to supply a normal picture, controls the rotational states of phosphor wheel 101 and color wheel 102 such that Index signal S3 is received from color wheel 102 when displaying an R image on DMD 104 and Index signal S1 is received from phosphor wheel 101 when displaying a B image on DMD 104.

The positions at which marks 506 and 503 are provided need not be the irradiation/emission positions on color wheel 102 and phosphor wheel 101, and further, the provided positions are also not limited to the emission start position of B light of phosphor wheel 101 and the emission start position of R light of color wheel 102. Even when the marks are provided to any positions on phosphor wheel 101 and color wheel 102, if the positional relation between the irradiation/emission position and the mirror or phosphors is well-defined for phosphor wheel 101, and if the positional relation between the irradiation/emission positions and each region are well-defined for color wheel 102, the illumination light obtained by phosphor wheel 101 and color wheel 102 can be matched with the modulation operation of DMD 104 shown in FIG. 6.

The above-described rotation control of the wheels that is matched with the image display presupposes that mark 506 is accurately formed between mirror 1011 and phosphor 1012 for phosphor wheel 101, that mark 503 is accurately formed between region 1023 and region 1022 for color wheel 102, and further, that the filter that is formed on color wheel 102 is accurately formed as designed. However, in actuality, due to error in manufacture, the phosphors, mirror, filters, and diffusion plates that are formed on each wheel may be fabricated at dimensions that differ from design, and in such cases, the ideal light quantity will not be supplied.

FIG. 7 shows the light quantity when mirror 1011 that supplies B and that is formed on phosphor wheel 101 is formed larger than region 1021 that is formed on color wheel 102. FIG. 7(a) shows the light quantity of one wheel rotation, and FIG. 7(b) shows an enlargement of the light quantity of the portion in which the required light quantity is not supplied.

As shown in FIGS. 7(a) and (b), B light is being supplied in the interval in which Y light is to be supplied from phosphor wheel 101. The B light that is supplied during this interval passes through the Y filter that is formed in region 1024 of color wheel 102, and the light quantity therefore decreases.

The size of the spoke region is determined by the beam diameter of a light beam that is incident to color wheel 102, but the range of error as shown in FIG. 7 is normally contained within a spoke region.

The decrease of the light quantity described above similarly occurs when the timing diverges for the interval in which B light is emitted in phosphor wheel 101 and the interval in which B light is transmitted in color wheel 102. FIG. 8 shows a state in which, despite the start of output of B from phosphor wheel 101, region 1021 of color wheel 102 is not synchronized and the B light is irradiated into the G filter of region 1022. In such cases as well, B passes through the G filter that is formed in region 1022 of color wheel 102, and the light quantity therefore decreases.

FIG. 9 is a figure showing a display example of a RAMP image (an image that gradually changes in luminance from 0 to 100% in the horizontal direction of the display screen).

FIG. 9(a) shows the RAMP image realized by ideal light output such as shown in FIG. 5, and FIG. 9(b) shows the RAMP image realized by light output in which a decrease in light quantity occurs in a portion of the ideal light output as shown in FIGS. 7 and 8.

In the case of the light output in which there is a decrease in light quantity in a portion shown in FIG. 9(b), a fault occurs in which a belt-like image is displayed in portions of the vertical direction and a smooth change in gradation is not achieved. The cause for this is that light that is emitted in spoke regions is used as the light that makes up white light, whereby the decreases in light quantity generated in the spoke regions influence specific gradations of the RAMP image.

The examples shown in FIGS. 7 and 8 are examples in which mirror 1011 formed in phosphor wheel 101 is formed larger than region 1021 formed in color wheel 102.

Apart from the examples shown in FIGS. 7 and 8, decreases in light quantity that is generated in spoke regions may also occur when the output timing of Index signal S1 from phosphor wheel 101 diverges from the actual output timing of B light or when the output timing of Index signal S3 from color wheel 102 diverges from the actual output timing of the R light.

Factors that can be considered as causes of the divergence in timing described above include inaccuracy in the formation of mark 506 between mirror 1011 and phosphor 1012 in the case of phosphor wheel 101 and inaccuracy in the formation of mark 503 between region 1023 and region 1022 in the case of color wheel 102. Further, individual differences in the detection timing of detectors 504 and 501 can also be considered as a factor. Decrease of light quantity generated in a spoke region that results from divergence in timing is thus the main reason for decrease in the light quantity generated in a spoke region due to the large number of causes of occurrence.

LITERATURE OF THE PRIOR ART

Patent Documents

Patent Document 1: Japanese Unexamined Patent Application Publication No. 2012-003213
Patent Document 2: Japanese Unexamined Patent Application Publication No. 2013-225089

DISCLOSURE OF THE INVENTION

Problem to be Solved by the Invention

As described above, when light that is emitted in a spoke region is used to make up white light, gradation reproducibility may deteriorate. In particular, gradation reproducibility may further deteriorate when an error occurs in a phosphor wheel and color wheel.

The present invention realizes a projector and a method of controlling the rotation of a phosphor wheel and a color wheel in a projector that can ensure uniform gradation reproducibility even when error occurs in a phosphor wheel and color wheel.

Means for Solving the Problem

The projector according to the present invention is provided with:
a phosphor wheel that is configured to be rotatable and in which a phosphor and a mirror and a first mark are formed around a rotational axis, the phosphor wheel both emitting fluorescence realized by the phosphor and excitation light realized by the mirror in a time series when irradiated by excitation light and supplying a first reference signal realized by the first mark for each rotation;
a color wheel that rotates in synchronization with the phosphor wheel and in which a specific region that is irradiated by the excitation light and a plurality of regions that are irradiated by the fluorescence and a second mark are formed around a rotational axis, the color wheel both emitting a plurality of illumination light beams being emitted from the specific region and the plurality of regions in a time series and supplying a second reference signal realized by the second mark for each rotation;
a DMD that modulates the plurality of illumination light beams emitted by the color wheel; and
a control unit that both controls a modulation operation of the DMD according to illumination light that is irradiated upon the DMD and, at the time of switching the modulation operation of a predetermined color, controls the rotation operation of the phosphor wheel and the color wheel on the basis of the first reference signal and second reference signal such that the excitation light is irradiated in the specific region;
wherein the control unit causes the DMD to display an image in which gradations change in steps, and controls the rotation operation of the phosphor wheel and the color wheel on the basis of color coordinate values of each gradation that are measured each time the input timings of the first reference signal and the second reference signal are changed a plurality of times.

The method of controlling the rotation of a phosphor wheel and a color wheel in the projector according to the present invention is a method of controlling the rotation of a phosphor wheel and a color wheel that is carried out in a projector that includes: a phosphor wheel that is configured to be rotatable and in which a phosphor and a mirror and a first mark are formed around a rotational axis, the phosphor wheel both emitting fluorescence realized by the phosphor and excitation light realized by the mirror in a time series when irradiated by excitation light and supplying a first reference signal realized by the first mark for each rotation; a color wheel that rotates in synchronization with the phosphor wheel and in which a specific region that is irradiated by the excitation light and a plurality of regions that are irradiated by the fluorescence and a second mark are formed around a rotational axis, the color wheel both emitting a plurality of illumination light beams being emitted from the specific region and the plurality of regions in a time series and supplying a second reference signal realized by the second mark for each rotation; a DMD that modulates the plurality of illumination light beams emitted by the color wheel; and a control unit that both controls the modulation operation of the DMD in accordance with the illumination light that is irradiated to the DMD and, at the time of switching the modulation operation of a predetermined color, controls the rotation operation of the phosphor wheel and the color wheel on the basis of the first reference signal and second reference signal such that the excitation light is irradiated to the specific region, the method comprising:
the control unit causing the DMD to display an image in which gradation changes in steps and controlling the rotation operation of the phosphor wheel and the color wheel on the basis of color coordinate values of each gradation that are measured each time the input timings of the first reference signal and the second reference signal are changed a plurality of times.

Effect of the Invention

In the projector according to the present invention that is provided with the above-described configuration, a uniform gradation reproducibility can be ensured even when an error occurs in the phosphor wheel and the color wheel.

BRIEF DESCRIPTION OF THE DRAWINGS

FIG. 1 is a block diagram showing the configuration of control system of a projector that is provided with a color wheel and a phosphor wheel.

FIG. 2 is a block diagram showing the configuration of the optical system of a projector that is provided with a color wheel and a phosphor wheel.

FIG. 3(a) shows the configuration of phosphor wheel 101 in FIG. 2 and FIG. 3(b) shows the configuration of color wheel 102 in FIG. 2.

FIG. 4(a) shows sites in which spoke regions occur, and FIG. 4(b) shows a spoke region.

FIG. 5 shows the ideal light output in the projector shown in FIGS. 1 and 2.

FIG. 6 is a view for describing the rotation control of phosphor wheel 101 and color wheel 102 by control unit 103.

FIG. 7 shows the light quantity when mirror 1011 that is formed on phosphor wheel 101 and that supplies B is formed larger than region 1021 that is formed on color wheel 102. FIG. 7(a) shows the light quantity of one wheel rotation, and FIG. 7(b) is an enlarged view of the light quantity of a portion in which the required light quantity is not supplied.

FIG. 8 shows the state in which, despite the start of output of B from phosphor wheel 101, B light is irradiated upon the G filter of 1022 out of synchronization of region 1021 of color wheel 102.

FIG. 9 shows examples of the display of RAMP images (images in which luminance gradually changes from 0 to 100% in the horizontal direction of the display screen). FIG. 9(a) shows a RAMP image realized by the ideal light output as shown in FIG. 5, and FIG. 9(b) shows a RAMP image realized by light output in which there is a decrease of light quantity in a portion of the ideal light output such as shown in FIGS. 7 and 8.

FIGS. 10(a)-(c) show the state in which phosphor wheel 101 and color wheel 102 supply Y light when phosphor wheel 101 and color wheel 102 are controlled to receive Index signal S1 from phosphor wheel 101 when DMD 104 is to display a Y image and receive Index signal S3 from color wheel 102 when DMD 104 is to display a Y image.

FIG. 11 shows the light quantity at the timing of time point (4) at which phosphor wheel 101 supplies Y light that surpasses the range of the spoke region.

FIG. 12 is a block diagram showing the configuration of the adjustment system according to the present example embodiment.

FIG. 13(a) shows the projected image of a RAMP image in which a band-like image is displayed where the image gradation is 50%; and FIG. 13(c) shows the projected image in which the gradation changes smoothly. FIGS. 13(b) and 13(d) each show the color coordinate values x, y of the site of gradation 50% and preceding and succeeding sites of FIGS. 13(a) and 13(c), respectively.

FIG. 14 is a flow chart showing the control operation that is carried out by control unit 103.

FIG. 15 shows the state in which a minimum value exists in three continuous measurements.

FIG. 16 is a flow chart showing the operation of the second example embodiment of the present invention.

FIG. 17 is a block diagram showing the configuration of the control system of a projector according to the present invention.

FIG. 18 is a block diagram showing the configuration of the optical system of a projector according to the present invention.

EXAMPLE EMBODIMENTS

Example embodiments of the present invention are next described with reference to the accompanying drawings.

First Example Embodiment

The configuration of the projector in the present example embodiment is similar to the configuration shown in FIGS. 1 to 3 and 6. As a result, configuration that is the same as that shown in FIGS. 1 to 3 and 6 is abbreviated in the figures and the same numbers are used in the explanation.

As shown in FIG. 6, when Index signal S3 is received as input, control unit 103 recognizes the existence of the boundary of region 1023 and region 1024 at which mark 503 is provided at the irradiation/emission position of color wheel 102 that is provided with detector 501, and when Index signal S1 is received as input, recognizes the existence of the boundary of mirror 1011 and phosphor 1012 at which mark 506 is provided at the irradiation/emission position of phosphor wheel 101 that is provided with detector 504.

Control unit 103 both causes phosphor wheel 101 and color wheel 102 to rotate in synchronization and controls the rotational state of phosphor wheel 101 and color wheel 102 such that Index signal S1 is received from phosphor wheel 101 when DMD 104 is to display a B image and such that Index signal S3 is received from color wheel 102 when DMD 104 is to display an R image.

Phosphor wheel 101 and color wheel 102 rotate in synchronization, and as a result, the time difference of receiving Index signal S1 and Index signal S3 is the same. This shows that the relation between the rotation positions of mark 503 and mark 506 is always the same.

FIG. 10(a) shows the state in which phosphor wheel 101 and color wheel 102 supply Y light, phosphor wheel 101 and color wheel 102 being controlled such that Index signal S1 is received from phosphor wheel 101 when DMD 104 is caused to display a Y image and Index signal S3 is received from color wheel 102 when DMD 104 is caused to display a Y image. As shown in the figure, the time point (1) at which phosphor wheel 101 supplies Y light is later than the time point at which color wheel 102 switches to region 1024 to supply Y light, and at the time point at which color wheel 102 switches to region 1024 to supply Y light, phosphor wheel 101 continues output by mirror 1011 that supplies B light. As a result, the intensity of the output light of color wheel 102 drops during the period after color wheel 102 has switched to region 1024 and until phosphor wheel 101 begins the output of Y light by phosphor 1014.

The control of the rotation of phosphor wheel 101 is carried out on the basis of Index signal S1, and the control of the rotation of color wheel 102 is carried out on the basis of Index signal S3. Phosphor wheel 101 and color wheel 102 rotate in synchronization, and the input timings of Index signal S1 and Index signal S3 therefore do not change and the positional relation shown in FIG. 10(a) continues.

In the present example embodiment, control unit 103 controls the rotation of phosphor wheel 101 and color wheel 102 such that the input timings of Index signal S1 and Index signal S3 gradually change. Compared to the case shown in FIG. 10(a), in FIG. 10(b), the time interval from the input of Index signal S3 until the input of Index signal S1 is set shorter, whereby the time point (2) at which phosphor wheel 101 supplies Y light is advanced to coincide with the time point at which color wheel 102 switches to region 1024 to supply Y light. In FIG. 10(c), the time interval from the input of Index signal S3 until the input of Index signal S1 is set still shorter than the case shown in FIG. 10(b), and time point (3) at which phosphor wheel 101 supplies Y light becomes earlier than the time point at which color wheel 102 switches to region 1024 to supply Y light.

As shown in FIGS. 10(a)-10(c), changing the input timings of Index signal S1 and Index signal S3 changes the relation of the time point at which phosphor wheel 101 supplies Y light with respect to the time point at which color wheel 102 supplies Y light, and as a result, the light quantity changes, and the gradation reproducibility also changes. The gradation reproducibility can therefore be improved by discovering and setting the optimum input timing that has good gradation reproducibility.

As shown in FIG. 11, at a timing for which time point (4) at which phosphor wheel 101 supplies Y light surpasses the range of a spoke region, time point (4) at which phosphor wheel 101 supplies Y light is too much earlier than the time point at which color wheel 102 switches to region 1024 to supply Y light and therefore has an impact on the pure R, G, and B color portions as shown by the broken-line circle. As a result, timing adjustment is carried out in the spoke region in the present example embodiment.

In the example shown in FIG. 10, the time interval from the input of Index signal S3 until the input of Index signal S1 is the object of adjustment, but the same effect is obtained by adjusting the time interval from the input of Index signal S1 until the input of Index signal S3.

FIG. 12 is a block diagram showing the configuration of the adjustment system according to the present example embodiment. This adjustment system includes signal generator 1201, projector 1202 that is provided with the control system shown in FIG. 1 and the optical system shown in FIG. 2, distance calculation unit 1203, color illuminance meter 1204, and screen 1205.

Signal generator 1201 supplies projector 1202 with a video signal that indicates a RAMP image, which is a full-white screen in which gradation changes in steps for each 10% from 10% to 100%. Projector 1202 switches the input timings from the input of Index signal S3 until the input of Index signal S1 to within the range of a spoke region to project the video signal from the signal generator onto screen 1205. Color illuminance meter 1204 acquires the color coordinate values x, y in each gradation of the projected image on screen 1205 and sends these color coordinate values to distance calculation unit 1203. Distance calculation unit 1203 computes the distance between the color coordinate values of neighboring gradations based on color coordinate values x, y in each gradation that was sent in from color illuminance meter 1204 and sends this computation result to projector 1202.

FIG. 13(a) shows a projected image that displays a belt-like image at gradation 50% of a RAMP image, and FIG. 13(c) shows a projected image in which the gradation changes smoothly. FIGS. 13(b) and 13(d) show color coordinate values x, y of gradation 50% of FIGS. 13(a) and 13(c), respectively, and sites that precede and follow.

As shown in FIG. 13(b), at the site displayed by the vertical belt-like image (hereinbelow referred to as "vertical band") such as shown in FIG. 13(a), the color coordinate value (x, y) of gradation 60% changes greatly from the color coordinate value (x, y) of gradation 50%, and the distance of movement is also great. In contrast, when the belt-like image is not displayed such as shown in FIG. 13(c), the color coordinate value (x, y) of gradation 50% does not change greatly from the preceding and following color coordinate values (x, y) and the distance of movement is small, as shown in FIG. 13(d). As a result, in the present example embodiment, the projector is caused to project a full-white screen and change the gradations in steps from 10 to 100%, and the color coordinate values are acquired. If the amount of change of the xy coordinate values (distance of change) is great preceding and following the measured gradations, vertical bands in which color changed will be present as shown in FIG. 13(a). If the amount of change is small, large changes will not be present between gradations, and vertical bands will not be present or can be determined as inconspicuous.

FIG. 14 is a flow chart showing the control operation that is carried out by control unit 103 in the present example embodiment.

Control unit 103 performs rotation control of phosphor wheel 101 and color wheel 102 according to Index signals S1 and S3 and a modulation signal to DMD 104 shown in FIG. 6 (Step S1401). At this time, the timing of the output of the Y light of phosphor wheel 101 and color wheel 102 is, for example, as shown in any of FIGS. 10(a)-10(c). The positions of phosphor wheel 101 and color wheel 102 according to the initial input timing of Index signals S1 and S3 is hereinbelow referred to as the Index position.

In the state of the Index position, control unit 103 projects a RAMP image that is a full-white screen in which the gradation changes in steps for each 10% from 10% to 100% according to a video signal from signal generator 1201, color illuminance meter 1204 detects color coordinate values x, y in each gradation, distance calculation unit 1203 calculates the distance between color coordinate values of neighboring gradations, and control unit 103 receives the distance between color coordinate values of neighboring gradations from distance calculation unit 1203 (Step S1402).

Control unit 103, upon receiving the distance between color coordinate values of neighboring gradations from distance calculation unit 1203, carries out rotation control of phosphor wheel 101 and color wheel 102 such that the input timings of Index signals S1 and S3 change by a predetermined amount (Step S1403). By changing the input timings of Index signals S1 and S3 to control unit 103 by the predetermined amount, the positions of phosphor wheel 101 and color wheel 102 change in proportion to the distance that is determined by the rotational speed of phosphor wheel 101 and color wheel 102 and the time interval realized by the amount of change of the input timings. The positions of phosphor wheel 101 and color wheel 102 when the input timings of Index signals S1 and S3 have been changed by a predetermined amount are referred to as the Index+i position. In this state, as with the case of Step S1402, control unit 103 receives the distance between the color coordinate values of neighboring gradations from distance calculation unit 1203 (Step S1404).

Control unit 103 next checks whether all measurements have been completed in the spoke region (Step S1405). As described above, the size of a spoke region is determined by the beam diameter of a light beam that is incident to color wheel 102. In the checking of Step S1405, control unit 103 recognizes the size of the spoke region of color wheel 102 on the basis of the beam diameter of the light beam that is incident to color wheel 102 in the optical system shown in FIG. 2 and checks whether the measurements carried out to that point have measured the entire spoke region.

Regarding the change of the input timings of Index signals S1 and S3, increasing the time interval from the input of Index signal S3 until the input of Index signal S1 causes the positional relation of phosphor wheel 101 and color wheel 102 to change, for example, from the state shown in FIG. 10(*a*) to the state shown in FIG. 10(*b*), and further, to the state shown in FIG. 10(*c*). In the present example embodiment, by making the Index position that is set in Step S1401 the start position of the spoke region of color wheel 102 (the right side in FIG. 10) and making the timing adjustment that is carried out in Step S1403 an adjustment that lengthens by a predetermined time interval the time interval from the input of Index signal S3 until the input of Index signal S1, phosphor wheel 101 shifts in the same direction with respect to color wheel 102 (from right to left in FIG. 10, which is counter-clockwise rotation when referred to by rotation). Conversely, the Index position that is set in Step S1401 may also be made the ending position of the spoke region of color wheel 102 (the left side in FIG. 10), and the timing adjustment that is carried out in Step S1403 may be made an adjustment of shortening by a predetermined time interval the time interval from the input of Index signal S3 until the input of Index signal S1.

The distance of divergence of phosphor wheel 101 with respect to color wheel 102 in Step S1403 is understood by means of the rotational speed of phosphor wheel 101 and color wheel 102 and the time of lengthening or the time of shortening of the time interval from the input of Index signal S3 until the input of Index signal S1. In addition, the number of the measurements of the spoke region that had to be carried out in Step S1402 and Step S1404 is also understood. The checking in Step S1405 is carried out by checking the number of measurements that were carried out in Step S1402 and Step S1404.

When it is verified in Step S1405 that there is a site that was not measured in the spoke region, the Index+i position is taken as the Index position (Step S1406) and the process returns to Step S1403.

When it is verified in Step S1405 that measurements were completed in all sites in the spoke region, the maximum distance between each gradation is checked in each of the measurements carried out in Step S1402 and Step S1404, and the rotation control of phosphor wheel 101 and color wheel 102 is carried out according to the input timings of Index signals S1 and S3 when each maximum distance becomes the minimum measurement (Step S1407).

By means of the above-described control, phosphor wheel 101 and color wheel 102 can be set to the optimum synchronized positions and uniform gradation reproducibility can be guaranteed.

Second Example Embodiment

The second example embodiment of the present invention is next described.

In the first example embodiment, distance calculation unit 1203 was described as calculating the distance between the color coordinate values of neighboring gradations in each of the measurements carried out in Step S1402 and Step S1404. In this case, the number of acquisitions of data becomes numerous, and this number of acquisitions is accompanied by an increase in the amount of calculation.

In the present example embodiment, in order to reduce the number of acquisitions of data and the amount of calculation, the number of acquisitions of data can be drastically reduced by performing a three-point approximation under the following conditions.

Assuming that: the synchronization position Index is the position of phosphor wheel 101 and color wheel 102 when the time interval from the input of Index signal S3 until the input of Index signal S1 is taken as the predetermined input timing; the distance (Index) is the maximum value of the distance between color coordinate values in each gradation at that time; the synchronization position Index+step is the position of phosphor wheel 101 and color wheel 102 when the input timing is caused to change by a predetermined amount from the input timing of Index signal S3 and Index signal S1 of the time of synchronization position Index; distance (Index+step) is the maximum value of the distance between color coordinate values in each gradation of that time; synchronization position Index+2*step is the position of phosphor wheel 101 and color wheel 102 when the input timing is caused to change by a predetermined amount from the input timings of Index signal S3 and Index signal S1 of synchronization position Index+step, and distance (Index+2*step) is the maximum value of the distance between color coordinate values in each gradation at that time; the following conditions are verified:

Conditions:

distance(Index)>distance(Index+step)

distance(Index+step)<distance(Index+2*step)

In other words, the existence of a minimum value is checked in three continuous measurements.

When the above-described conditions are satisfied as shown in FIG. 15, the optimum synchronization position is calculated by means of the three-point approximation shown below.

Approximate Expression

A secondary function $y=ax^2+bx+c$ that passes through three points $(x_1, y_1)$ $(x_2, y_2)$ $(x_3, y_3)$ from:

$$y_1 = ax_1^2 + bx_1 + c$$

$$y_2 = ax_2^2 + bx_2 + c$$

$$y_3 = ax_3^2 + bx_3 + c \qquad \text{[Formula 1]}$$

is found as:

$$a = \frac{(y_1 - y_2)(x_1 - x_3) - (y_1 - y_3)(x_1 - x_2)}{(x_1 - x_2)(x_1 - x_3)(x_2 - x_3)}$$

$$b = \frac{(y_1 - y_2) - a(x_1^2 - x_2^2)}{(x_1 - x_2)} = \frac{y_1 - y_2}{x_1 - x_2} - a(x_1 + x_2)$$

$$c = y_1 - ax_1^2 + bx_1$$

Further, the maximum value (extreme value) of this function is found as:

$$x_{max} = -\frac{b}{2a}$$

In actuality, x is synchronization position (Index value), and y is maximum distance (distance (Index)).

FIG. 16 is a flow chart that shows the operation of an example embodiment that uses the above-described approximation.

The operations in Step S1601-S1604 are similar to steps S1401-S1404 shown in FIG. 14. In the present example embodiment, control unit 103, upon receiving from distance calculation unit 1203 the distance between the color coordinate values of neighboring gradations in Step S1604, checks whether a minimum value exists in three continuous most-recent measurements (Step S1605), takes Index+i position as the Index position when there is no minimum value (Step S1606), and returns to Step S1603.

When the existence of a minimum value is verified in Step S1605, without making subsequent measurements, three-point approximation is carried out by means of the maximum distance and synchronization position shown in FIG. 15, the optimum synchronization position is found from these results, and the rotation operation of phosphor wheel 101 and color wheel 102 is controlled.

In the present example embodiment, after having verified that a minimum value exists by three most-recent continuous measurements as described above, data acquisition is not carried out. As a result, the number of acquisitions of data can be substantially reduced.

Third Example Embodiment

The signal generator 1201, distance calculation unit 1203, and color illuminance meter 1204 shown in FIG. 12 are provided outside projector 1202. This configuration is due to the presupposition that the adjustment of the phosphor wheel and color wheel described above is carried out in the fabrication steps of projector 1202. In the present example embodiment, the color illuminance meter is provided inside the projector, and the adjustment of the phosphor wheel and color wheel is carried out at any timing.

FIG. 17 is a block diagram showing the configuration of the control system of a projector according to the present invention, and FIG. 18 shows the configuration of the optical system of this projector.

In the control system in the present example embodiment, color illuminance meter 1701 is added to the configuration shown in FIG. 1. Control unit 103 in the present example embodiment both carries out a control operation in the first example embodiment or second example embodiment and carries out the operation of signal generator 1201 and distance calculation unit 1203 shown in FIG. 12.

When carrying out rotation control of phosphor wheel 101 and color wheel 102, control unit 103 causes DMD 104 to display a RAMP image, which is a full-white screen in which the gradation changes in steps for each 10% from 10% to 100%, and at this time, acquires color coordinate value x, y in each gradation that is sent in from color illuminance meter 1701 and calculates the distance between color coordinate values of neighboring gradations. The rotation control of phosphor wheel 101 and color wheel 102 is subsequently carried out by the processes shown in FIG. 14 or FIG. 16.

The optical system shown in FIG. 18 is of a configuration in which color illuminance meter 1701 and beam splitter 1801 have been added to the configuration shown in FIG. 2. Beam splitter 1801 reflects a portion of an image that has been modulated by DMD 104 toward color illuminance meter 1701, whereby color illuminance meter 1701 measures the color coordinate values x, y in each gradation.

As described above, the projector itself may constitute a system that carries out the rotation control of phosphor wheel 101 and color wheel 102.

Conventionally, the rotation control of phosphor wheel 101 and color wheel 102 could not be judged unless the picture that is actually projected is checked, but in the present invention, both the determination of the quality of gradation reproducibility and the discovery of the optimum point can be realized from the measurement results of a color illuminance meter. In this way, uniform gradation reproducibility can be guaranteed.

EXPLANATION OF REFERENCE NUMBERS 101 phosphor wheel
102 color wheel
103 control unit
104 DMD
105 laser drive circuit
106 semiconductor laser

The invention claimed is:

1. A projector comprising:
a phosphor wheel that is configured to be rotatable and in which a phosphor and a mirror and a first mark are formed around a rotational axis, said phosphor wheel both emitting fluorescence realized by said phosphor and excitation light realized by said mirror in a time series when irradiated by excitation light and supplying a first reference signal realized by said first mark for each rotation;
a color wheel that rotates in synchronization with said phosphor wheel and in which a specific region that is irradiated by said excitation light and a plurality of regions that are irradiated by said fluorescence and a second mark are formed around a rotational axis, said color wheel both emitting a plurality of illumination light beams being emitted from said specific region and said plurality of regions in a time series and supplying a second reference signal realized by said second mark for each rotation;
a Digital Micromirror Device (DMD) that modulates said plurality of illumination light beams emitted by said color wheel; and
a control unit that both controls a modulation operation of said DMD according to illumination light that is irradiated upon the DMD and, at the time of switching the modulation operation of a predetermined color, controls the rotation operation of said phosphor wheel and said color wheel on the basis of said first reference signal and second reference signal such that said excitation light is irradiated in said specific region;
wherein:
said control unit causes said DMD to display an image in which gradations change in steps; changes the input timings of said first reference signal and said second reference signal a plurality of times to measure color coordinate values of each gradation; and controls the rotation operation of said phosphor wheel and said color wheel on the basis of the coordinate values of each gradation that are measured for every time that the input timings change.

2. The projector as set forth in claim 1, wherein said control unit controls the rotation operation of said phosphor wheel and said color wheel by the input timings of said first reference signal and said second reference signal in which the maximum value of the distance between color coordinate values of each gradation is a minimum.

3. The projector as set forth in claim 1, wherein said control unit carries out three-point approximation when a minimum value exists in three continuous most-recent measurements regarding the maximum value of the distance between color coordinate values of each gradation obtained by changing the input timings of said first reference signal and said second reference signal; and on the basis of the result of this three-point approximation, controls the rotation operation of said phosphor wheel and said color wheel.

4. A projector comprising:
   a phosphor wheel that is configured to be rotatable and in which a phosphor and a mirror and a first mark are formed around a rotational axis, said phosphor wheel both emitting fluorescence realized by said phosphor and excitation light realized by said mirror in a time series when irradiated by excitation light and supplying a first reference signal realized by said first mark for each rotation;
   a color wheel that rotates in synchronization with said phosphor wheel and in which a specific region that is irradiated by said excitation light and a plurality of regions that are irradiated by said fluorescence and a second mark are formed around a rotational axis, said color wheel both emitting a plurality of illumination light beams being emitted from said specific region and said plurality of regions in a time series and supplying a second reference signal realized by said second mark for each rotation;
   a Digital Micromirror Device (DMD) that modulates said plurality of illumination light beams emitted by said color wheel and that emits the result as image light;
   a color illuminance meter that measures image light that has been modulated by said DMD; and
   a control unit that both controls the modulation operation of said DMD according to illumination light that is irradiated upon the DMD and, at the time of switching the modulation operation of a predetermined color, controls the rotation operation of said phosphor wheel and said color wheel on the basis of said first reference signal and second reference signal such that said excitation light is irradiated in said specific region;
   wherein:
   said control unit causes said DMD to display an image in which gradations change in steps; changes the input timings of said first reference signal and said second reference signal a plurality of times to cause said color illuminance meter to measure color coordinate values of each gradation; and controls the rotation operation of said phosphor wheel and said color wheel on the basis of the color coordinate values of each gradation that are measured by said color illuminance meter for every time that the input timings change.

5. The projector as set forth in claim 4, wherein said control unit controls the rotation operation of said phosphor wheel and said color wheel at the input timings of said first reference signal and said second reference signal in which the maximum value of the distance between color coordinate values of each gradation becomes a minimum.

6. The projector as set forth in claim 4, wherein said control unit carries out three-point approximation when a minimum value exists in three most-recent continuous measurements regarding the maximum value of the distance between color coordinate values of each gradation obtained by changing the input timings of said first reference signal and said second reference signal; and controls the rotation operation of said phosphor wheel and said color wheel on the basis of the results of the three-point approximation.

7. A method of controlling the rotation of a phosphor wheel and a color wheel in a projector that is carried out in a projector that includes: a phosphor wheel that is configured to be rotatable and in which a phosphor and a mirror and a first mark are formed around a rotational axis, said phosphor wheel both emitting fluorescence realized by said phosphor and excitation light realized by said mirror in a time series when irradiated by excitation light and supplying a first reference signal realized by said first mark for each rotation; a color wheel that rotates in synchronization with said phosphor wheel and in which a specific region that is irradiated by said excitation light, a plurality of regions that are irradiated by said fluorescence and a second mark are formed around a rotational axis, said color wheel both emitting a plurality of illumination light beams being emitted from said specific region and said plurality of regions in a time series and supplying a second reference signal realized by said second mark for each rotation; a Digital Micromirror Device (DMD) that modulates said plurality of illumination light beams emitted by said color wheel; and a control unit that both controls the modulation operation of said DMD in accordance with the illumination light that is irradiated to the DMD and, at the time of switching the modulation operation of a predetermined color, controls the rotation operation of said phosphor wheel and said color wheel on the basis of said first reference signal and second reference signal such that said excitation light is irradiated to said specific region, said method comprising:
   said control unit causing said DMD to display an image in which gradation changes in steps; changing the input timings of said first reference signal and said second reference signal a plurality of times to measure color coordinate values of each gradation; and controlling the rotation operation of said phosphor wheel and said color wheel on the basis of the coordinate values of each gradation that are measured for every time that the input timings change.

8. The method as set forth in claim 7, wherein said control unit controls the rotation operation of said phosphor wheel and said color wheel at input timings of said first reference signal and said second reference signal for which the maximum value of the distance between color coordinate values of each gradation becomes a minimum.

9. The method as set forth in claim 7, wherein said control unit carries out three-point approximation when there is a minimum value in three most-recent continuous measurements regarding the maximum value of the distance between color coordinate values of each gradation obtained by changing the input timings of said first reference signal and said second reference signal; and based on the result of this three-point approximation, controls the rotation operation of said phosphor wheel and said color wheel.

* * * * *